United States Patent [19]

Basso

[11] Patent Number: 4,668,109

[45] Date of Patent: May 26, 1987

[54] JOURNAL WITH SPRING LOADED BEARINGS

[76] Inventor: Robert J. Basso, 3635 Afton Rd., San Diego, Calif. 92123

[21] Appl. No.: 890,922

[22] Filed: Jul. 31, 1986

[51] Int. Cl.$^4$ .............................................. F16C 25/08
[52] U.S. Cl. ................................... 384/518; 384/473; 384/484
[58] Field of Search ............... 384/518, 484, 473, 517, 384/563, 215, 220

[56] References Cited

U.S. PATENT DOCUMENTS

| | | | |
|---|---|---|---|
| 3,686,986 | 8/1972 | Ledergerber et al. | 384/563 |
| 4,529,324 | 7/1985 | Champagne et al. | 384/518 |
| 4,551,032 | 11/1985 | Mottershead | 384/517 |
| 4,618,272 | 10/1986 | Lindström | 384/517 |

Primary Examiner—Lenard A. Footland
Attorney, Agent, or Firm—Ralph S. Branscomb

[57] ABSTRACT

A sealed, oil-filled journal is provided which includes two axially-spaced ball race areas in the preferred embodiment, and which incorporates an axially expanding pressure ring disposed between an internal annular rib and the angular contact ballbearing ring in one of the ball race chambers. The pressure ring maintains generally constant force against all of the bearings in the spaced ball race chambers so that the combination of the immersion in oil of all the bearings in the journal, and the maintenance of the constant pressure on the bearing elements to prevent their getting loose, minimizes brinelling and produces a jounral that has a very long life span.

6 Claims, 3 Drawing Figures

JOURNAL WITH SPRING LOADED BEARINGS

BACKGROUND OF THE INVENTION

The journal of the instant invention was invented for use in the field of wind turbines. In particular, the journal is used to mount the blades of the wind turbine to the central rotor such that the pitch of the blades can be adjusted as the rotor rotates. Adjustment of blade pitch is the mechanism used in the wind turbines under discussion to maintain a constant RPM of the turbine rotor, and to prevent the mechanism from running away under high wind conditions and causing the entire wind turbine to crash.

When the wind turbines were used with prior art journal mechanisms, in time the oxidation of the bearings reduced the diameters of the bearings slightly, and at the same time introduced an abrasive oxide powder into the journal mechanism. The slightly loose bearings coupled with this abrasive powder, would continue to grind away at both the bearings and the bearing races (roller bearings were used previously), causing a brinelling of the races, creating cavitated areas which eventually caused the journal to freeze up, or at least become stiff enough that the pitch adjusting mechanism was thwarted by the bearing.

With the blade pitch adjustment mechanism incapacitated, it would be just a matter of time before a high wind condition would arise to which the pitch adjustment mechanism could not respond, causing a runaway rotor condition and a flying apart and crashing of the entire turbine assembly.

Occurrence such as this indicated a need for an antibrinelling journal. The two principal causes of brinelling (first, the wearing of the bearing element until it is loose, permitting wobbling and vibration; and second, the generation of abrasive oxide within the journal mechanism as the bearing wears), indicated that a journal which is oil-filled to prevent oxidation of the bearing elements, and the utilization of some type of pressure mechanism to keep a steady force on the bearings, even as they wore somewhat, were indicated as the solution to the problem.

SUMMARY OF THE INVENTION

The journal disclosed herein utilizes the above two design features to minimize and probably eliminate brinelling. The invention comprises a cylindrical casing, which when implemented as shown in the preferred embodiment, is the fixed member of the journal. Passing through the casing is a coaxial shaft which rotates inside the casing, and mounts the wind turbine blade on one end.

The casing and the shaft define first and second bearing chambers which are divided by an annular rib on the internal side of, and generally centrally of, the cylindrical casing. The first chamber sets two angular contact bearing rings, and the second chamber captures two more angular contact bearing rings and an angularly expanding pressure ring between the above-mentioned rib and a shoulder defined on the shaft. This pressure ring acts to maintain a continuous axially expansive pressure between the rib and the two bearing rings in the second chamber, with the force being transferred through the casing to apply an equal compressive force against the angular contact, thrust and radial load bearings of the first chamber, so that the races apply a constant pressure on the bearings even should they diminish in diameter somewhat with wear.

The two ends of the journal are provided with double annular oil seals, and the bearing areas are completely filled with oil. Assuming the effectiveness of the oil seals, and the O-rings also utilized in construction, there is no way for the oil to escape and consequently no mechanism for the introduction of air in oxygen into the internal workings of the journal to oxidize the bearings and the bearing races.

Thus, the goals of producing a positive pressure against the bearings despite their wearing, and the elimination of air and oxygen through the maintenance of an oil-filled journal, have been achieved.

DETAILED DESCRIPTION OF THE PREFERRED EMBODIMENTS

Figure 1:
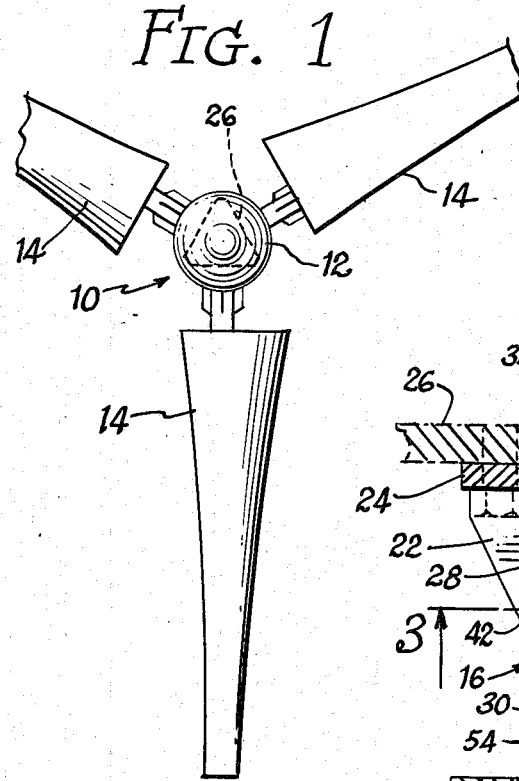
FIG. 1 is a front elevation, diagrammatic view of a portion of a wind turbine rotor with its pitch-adjustable blades.

The invention is part of a wind turbine assembly, indicated at 10, which has a central rotor 12 and three variable pitch blades 14. The journal of the instant invention does not journal the rotary motion of the rotor, but journals the blades about their longitudinal axis to permit their pitch variation to accommodate variations in wind velocity.

Each of the blades 14 utilizes one of the journals 16, so that there are three journals mounted by the drum structure 12. There is also a pitch adjustment crank mechanism 18 for each of the blades, and a central angularly adjustable spider connecting all three of the cranks within the rotor so that the pitch of all the blades is simultaneously adjusted.

The crank and pitch adjustment mechanism are peripherally relevant to the instant invention and have not been detailed. Although these mechanisms help to structure the environment of the journal as is used currently, clearly the application of the journal is not limited to wind turbines.

In the implementation of the journal in the preferred embodiment, the outer, cylindrical casing 20 of the journal is fixed to the drum 12. This is accomplished by means of the triangular flanges 22 welded to the casing and the reinforcing plate 24, with the latter being bolted to a plate 26 of the rotor 12. Thus, although the rotor 12 will be rotating, insofar as the reltive motion within the journal 16 itself is concerned, the cylindrical, outer casing 20 is fixed.

The member which is free to rotate within the cylindrical casing 20 is the internal shaft 25. The internal shaft has a shoulder 27 at its base, and extends up completely through the casing. The shaft is spaced from the casing to define first and second bearing ring chambers 28 and 30, adjacent the arbitrarily denominated first and second ends of the casing and shaft, corresponding respectively to the top and bottom portions of those members in the orientation shown in FIG. 2.

The outer end of the first bearing chamber is closed by means of a spacer rings 32 and a duplex oil seal 34.

The spacer ring is held in place by a retainer ring 36 which threadedly engages the first end of the shaft. The spacer 32 cooperates with the central, internal annular rib 38, which is part of the casing 20, to compress together the angular contact ballbearing rings 40 in the first chamber.

In a somewhat similar arrangement in the second bearing chamber, there is first an expansion ring 42 on the other side of the internal rib 38 from the first bearing chamber. Captured between the expansion ring and the shoulder 27 is a second pair of bearing rings 44 in the second ring chamber 30.

Figure 2:
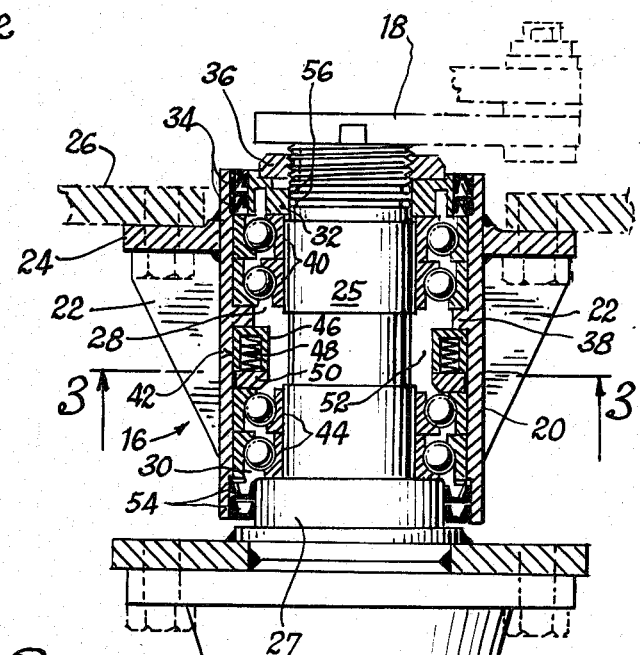
FIG. 2 is an actual section taken through one of the journals of the instant invention, and indicating in phantom the way in which the blade and the pitch adjustment mechanism connect through the journal structure.
Figure 3:
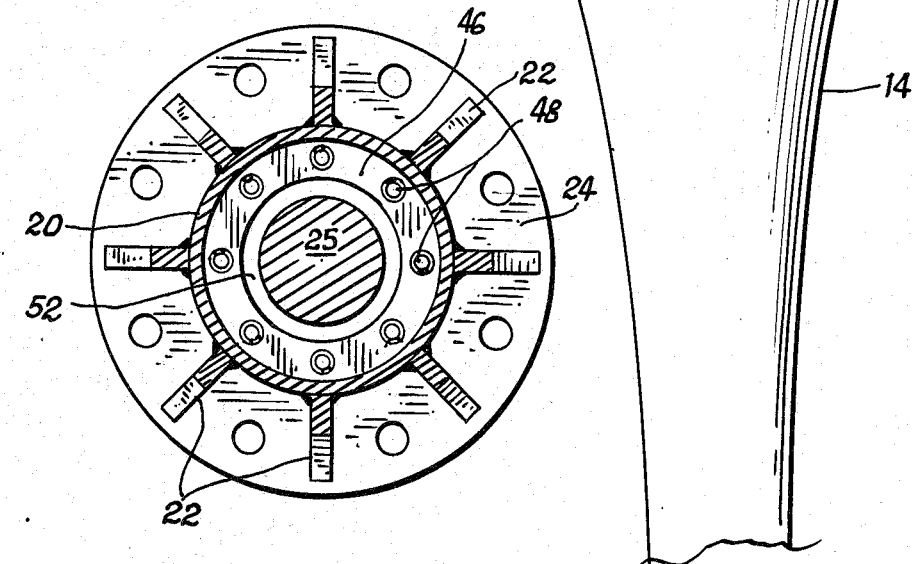
FIG. 3 is a section taken along line 3—3 of FIG. 2.

The expanding ring 42 could take a variety of forms, but in the preferred embodiment, it comprises an annular member 46 having spaced bores which house coiled springs 48, which are extended in the radial or longitudinal direction as shown in FIG. 2. These springs can also be seen, seated in their bores, in FIG. 3.

A thick washer 50 contacts the exposed ends of these springs, holding these springs under compression so that there is a perpetual expansive force exerted between the members 46 and 50.

This expansive force translates into a compressive force on all the ballbearing elements as can be seen by an inspection of FIG. 2. Because axial compression against the races of the angular contact bearing rings will cause both radial and axial compressive forces against the bearings, the ring 42 causes a direct, continuous compressive force against the bearing elements in the second bearing rings 44.

This force in turn pulls the shaft down, taking its orientation from FIG. 2, relative to the stationary casing 20, which in turn pulls the spacer 32 against the race of the bearings in the upper chamber, causing a substantially equal compressive force, in both radial and axial directions, against the bearing elements in the two upper bearing rings 40. As any of the bearings wear, therefore, the coil springs 48 will expand axially slightly, taking up the slack, so there is no play between the bearings and their races. Because there is no play, the wobbling and vibration associated with bearing play is absent, and brinelling will be virtually eliminated.

As indicated above, the journal is also oil-filled. The entire open chamber area 52, which includes both ballbearing chambers and a central region, is filled with oil. The oil is kept inside the journal by means of the above-mentioned oil seals 34, a second duplex oil seal 54 between the casing and the shoulder region 27 of the shaft, and a pair of O-rings 56 between the spacer ring and the first end of the shaft. The double protection at both ends of the journal make it virtually leakproof, and in turn causes the virtually complete elimination of air and oxygen into the internal workings of the journal.

The journal as set forth and claimed in this specification has been operational in wind turbines for a considerable length of time, having replaced prior art journals which have caused brinelling and thus, in some instances, the crashing of the wind turbines. Inspection subsequent to many, many hours of wear, indicate that in fact the brinelling problem has been completely eliminated by the new journal. The variability of the pitch of the blades is maintained and achievable with the application of a very small force by the pitch adjustment mechanism, which is made possible by the continued, smooth operation of the instant journal.

I claim:

1. A journal comprising:
   (a) a cylindrical outer casing having a first and a second end and a coaxial generally central internal annular rib;
   (b) a shaft passing coaxially through said casing and having a first and second end corresponding to the first and second ends of said casing, and defining with said casing a first annular bearing chamber and a second annular bearing chamber axially spaced from the first annular bearing chamber;
   (c) said shaft having a shoulder at the second end, and including at least one angular contact bearing ring and an axially expanding pressure ring captured between said shoulder and internal rib in said second chamber; and,
   (d) the first end of said shaft having a retainer ring thereon and including at least one angular contact bearing ring captured between said internal rib and said retainer ring in said first chamber.

2. Structure according to claim 1 wherein there are two angular contact bearing rings in each of said first and second chambers.

3. Structure according to claim 2 wherein each of said bearing rings is a ball bearing ring and has an inner and outer ball race, and each of said bearings is configured such that axial compressive force between the respective inner and outer races causes both radial and axial compression against the ballbearings therebetween.

4. Structure according to claim 1 wherein the first and second ends of said shaft and casing have oil seals therebetween, respectively, and said journal is oil-filled.

5. Structure according to claim 4 wherein double oil seals are provided at each end of the journal.

6. Structure according to claim 1 wherein said axially expanding pressure ring comprises a coil spring seating ring having a plurality of angularly spaced, axially extended bores open at one end for seating coil springs, and including a coil spring in each of said bores, and a washer compressed against the ends of said coil springs at the open ends of said bores.

* * * * *